(12) United States Patent
Ruknudeen et al.

(10) Patent No.: US 8,817,247 B2
(45) Date of Patent: Aug. 26, 2014

(54) PRECISION APPROACH PATH INDICATOR MEASUREMENT SYSTEMS AND METHODS

(75) Inventors: Fazludeen Ruknudeen, Bangalore (IN); Vivek Viswambharan, Kollam (IN); Shinu Gervasis, New Delhi (IN)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 13/612,330

(22) Filed: Sep. 12, 2012

(65) Prior Publication Data

US 2014/0071441 A1 Mar. 13, 2014

(51) Int. Cl.
*G01B 11/26* (2006.01)

(52) U.S. Cl.
USPC ............... 356/139.04; 356/138; 356/139.01; 356/139.07; 356/139.09; 356/141.1; 356/141.2; 356/152.2; 356/399

(58) Field of Classification Search
USPC ................ 356/139.04, 138, 139.01, 139.07, 356/139.09, 141.1, 141.2, 152.2, 399
See application file for complete search history.

(56) References Cited

U.S. PATENT DOCUMENTS

| 5,826,874 | A  | * | 10/1998 | Teitell et al. ............... 473/225 |
| 7,102,754 | B2 | * | 9/2006  | Ohtsuka et al. ............. 356/445 |
| 7,672,058 | B2 | * | 3/2010  | Jiang et al. ................. 359/665 |
| 2010/0123398 | A1 | | 5/2010  | Tian et al. |
| 2010/0132433 | A1 | | 6/2010  | Tian et al. |
| 2011/0032519 | A1 | * | 2/2011  | Coletti et al. ............. 356/139.1 |
| 2011/0285294 | A1 | * | 11/2011 | Hansler et al. ............ 315/152 |

* cited by examiner

*Primary Examiner* — Luke Ratcliffe
*Assistant Examiner* — Samantha K Abraham
(74) *Attorney, Agent, or Firm* — Brooks, Cameron & Huebsch, PLLC

(57) ABSTRACT

Precision approach path indicator (PAPI) measurement systems and methods are described herein. One system includes a number of light sensor modules, wherein each light sensor module is configured to determine an intensity of a beam of light from a PAPI unit, a memory, and a processor configured to execute executable instructions stored in the memory to determine a transition angle of the beam of light from the PAPI unit, an elevation angle of the beam of light with respect to horizontal, and a width of a transition region of the beam of light, based, at least in part, on the intensity of the beam of light determined by each light sensor module.

20 Claims, 2 Drawing Sheets

PRECISION APPROACH PATH INDICATOR MEASUREMENT SYSTEMS AND METHODS

TECHNICAL FIELD

The present disclosure relates to precision approach path indicator (PAPI) measurement systems and methods.

BACKGROUND

A precision approach path indicator (PAPI) is equipment installed at an airfield to guide pilots during their approach (e.g., descent) to the runway for a safe landing. The PAPI guides the pilot by providing the pilot with the correct glide path (e.g., angle) to take during the approach to the runway.

A PAPI generally includes four light emitting units placed at the side of the runway. Each PAPI unit emits a circular beam of light, the lower half of which is red and the upper half of which is white. The inclination angle of each PAPI unit is set (e.g., fixed) such that the pilot will see the two lights closest to the runway as red and the other two lights as white when the pilot is on the correct glide path during the approach. If the pilot sees three of the lights as one color and the other light as the other color, or if the pilot sees all four of the lights as the same color, that indicates the pilot is not on the correct glide path, and needs to alter his glide path accordingly.

In previous approaches, the inclination angle of a PAPI unit may be manually (e.g., mechanically) measured and set using, for example, an inclinometer or clinometer. However, the inclination angle of the PAPI unit may not be aligned with the inclination angle of the beam of light emitted from the PAPI unit (e.g., there may be a misalignment between the mechanical axis of the PAPI unit and the optical axis of the PAPI unit). Accordingly, manually measuring and setting the inclination angle of the PAPI unit using an inclinometer or clinometer may result in the PAPI unit providing an incorrect (e.g., inaccurate) glide path (e.g., a glide path that differs from the correct glide path by at least five minutes of arc). That is, a PAPI unit whose inclination angle is manually measured and set (e.g., using an inclinometer or clinometer) may not provide the correct glide path (e.g., a glide path that differs from the correct glide path by less than five minutes of arc).

DETAILED DESCRIPTION

Figure 1:
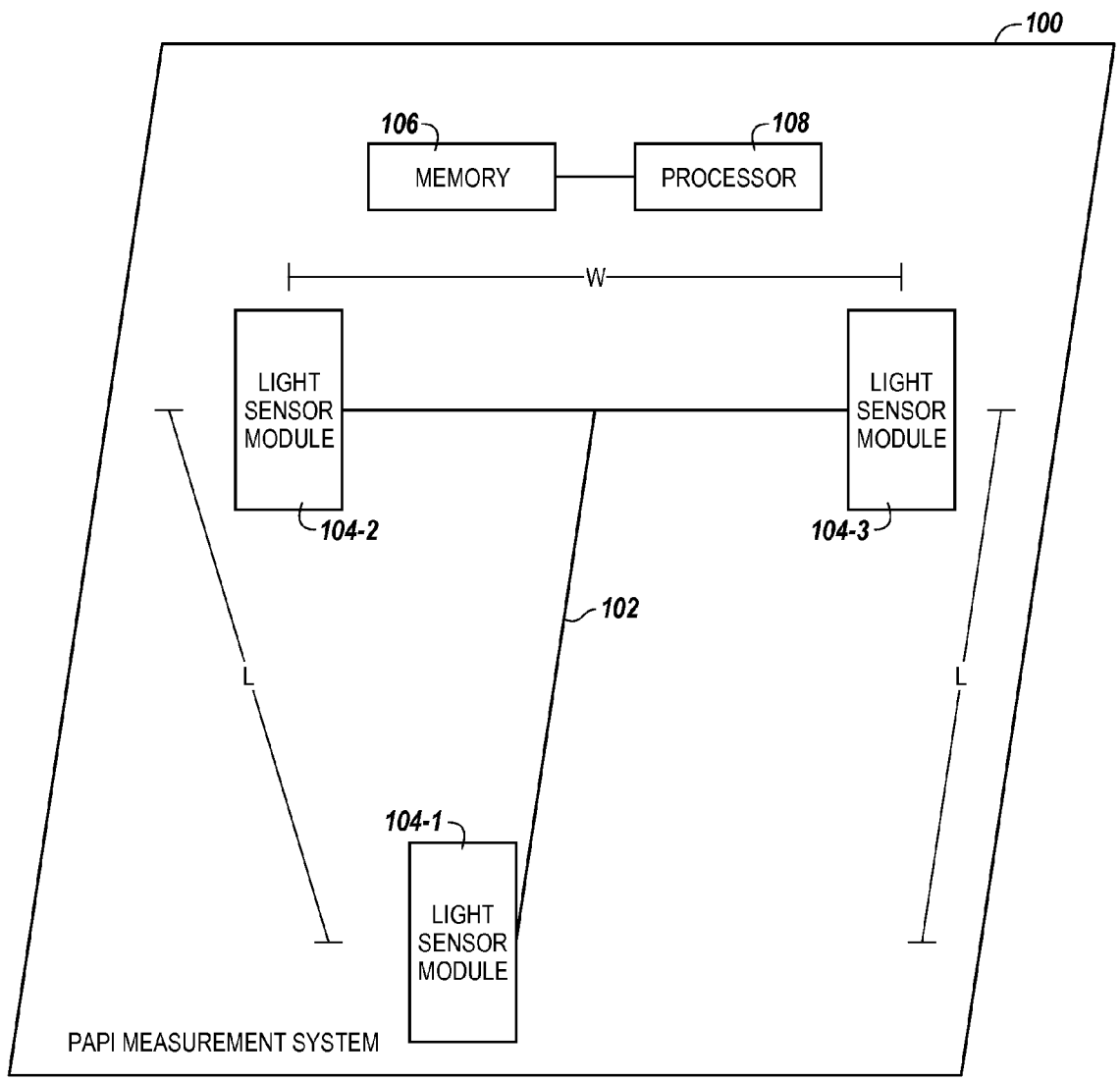
FIG. 1 illustrates a PAPI measurement system in accordance with one or more embodiments of the present disclosure.

Precision approach path indicator (PAPI) measurement systems and methods are described herein. For example, one or more embodiments include a number of light sensor modules, wherein each light sensor module is configured to determine an intensity of a beam of light from a PAPI unit, a memory, and a processor configured to execute executable instructions stored in the memory to determine a transition angle of the beam of light from the PAPI unit, an elevation angle of the beam of light with respect to horizontal, and a width of a transition region of the beam of light, based, at least in part, on the intensity of the beam of light determined by each light sensor module.

PAPI measurement systems and methods in accordance with one or more embodiments of the present disclosure can overcome a misalignment between the mechanical axis of a PAPI unit and the optical axis of the PAPI unit. Accordingly, PAPI measurement systems and methods in accordance with one or more embodiments of the present disclosure can be used to ensure a PAPI unit is providing the correct glide path (e.g., a glide path that differs from the correct glide path by less than five minutes of arc). For instance, PAPI measurement systems and methods in accordance with one or more embodiments of the present disclosure can be used to ensure a PAPI unit is providing a glide path having an accuracy and/or precision of one minute of arc or better. Further, PAPI measurement systems and methods in accordance with one or more embodiments of the present disclosure can be simple, cost effective, easy to operate, and/or have low power consumption, among other benefits.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 104 may reference element "04" in FIG. 1, and a similar element may be referenced as 204 in FIG. 2.

As used herein, "a" or "a number of" something can refer to one or more such things. For example, "a number of light sensor modules" can refer to one or more light sensor modules.

FIG. 1 illustrates a PAPI measurement system 100 in accordance with one or more embodiments of the present disclosure. PAPI measurement system 100 can be mounted on a tripod (not shown in FIG. 1) at a height of, for example, 1.5 to 2.0 meters and placed at a distance of, for example, approximately 10 meters from a PAPI unit.

As shown in FIG. 1, PAPI measurement system 100 can include a number of light sensor modules. For example, in the embodiment illustrated in FIG. 1, PAPI measurement system 100 includes three light sensor modules 104-1, 104-2, and 104-3.

As shown in FIG. 1, each light sensor module 104-1, 104-2, 104-3 can be located at a different vertex of a triangular plane (e.g., light sensor module 104-1 is located at a first vertex of the triangular plane, light sensor module 104-2 is located at a second vertex of the triangular plane, and light sensor module 104-3 is located at a third vertex of the triangular plane), or any other geometrical arrangement that can be reduced to the same, such as, for instance, the three light sensor modules being located along three non-coplanar lines.

For example, in the embodiment illustrated in FIG. 1, PAPI measurement system includes a T-shaped structure 102, with each light sensor module 104-1, 104-2, 104-3 located at (e.g., mechanically coupled to) a different end of T-shaped structure 102 (e.g., light sensor module 104-1 is located at a first end of T-shaped structure 102, light sensor module 104-2 is located at a second end of T-shaped structure 102, and light sensor module 104-3 is located at a third end of T-shaped structure 102). For instance, light sensor module 104-1 can be located at the front end of T-shaped structure 102, and light sensor modules 104-2 and 104-3 can be located at the back ends of T-shaped structure 102, as illustrated in FIG. 1. Further, in some embodiments, light sensor modules 104-1, 104-2, and/or 104-3 can be detachable from their respective end of T-shaped structure 102.

As shown in FIG. 1, each of the light sensor modules 104-1, 104-2, 104-3 can be separated by a fixed length. For example, in the embodiment illustrated in FIG. 1, light sensor modules 104-2 and 104-3 are separated by a first fixed length W, light sensor modules 104-1 and 104-2 are separated by a second fixed length L, and light sensor modules 104-1 and 104-3 are also separated by fixed length L.

The fixed length(s) separating the light sensor modules can depend on, for example, the resolution of the light sensor modules. For example, the lower the resolution of the light sensor modules, the greater the fixed length(s) separating the light sensor modules.

Each light sensor module 104-1, 104-2, 104-3 can determine (e.g., measure) the color of a beam of light from (e.g., emitted by) a PAPI unit, which may be done by measuring the relative intensity of that portion of the beam or otherwise. Determining the intensity (e.g., the intensity profile) of the beam of light can include, for example, determining the intensity of different portions of the beam of light, with the intensity of each portion of the beam corresponding to the color of that portion of the beam. For instance, the red portion(s) of the beam of light may have a first intensity, the portion(s) of the beam of light that transition from red to white may have a second intensity that is greater than the first intensity, and the white portion(s) of the beam of light may have a third intensity that is greater than the second intensity. Accordingly, by determining the intensity of the beam of light, each light sensor module can identify the transition region where the beam transitions (e.g., switches and/or changes color) from a first color (e.g., red) to a second color (e.g., white). Examples of light sensor modules 104-1, 104-2, 104-3 will be further described herein (e.g., in connection with FIGS. 2-4).

As shown in FIG. 1, PAPI measurement system 100 can include a memory 106 and a processor 108 coupled to memory 106. Memory 106 can be any type of storage medium that can be accessed by processor 108 to perform various examples of the present disclosure. For example, memory 106 can be a non-transitory computer readable medium having computer readable instructions (e.g., computer program instructions) stored thereon that are executable by processor 108 to determine a transition angle of the beam of light from the PAPI unit based, at least in part, on the intensity profile of the beam of light as intercepted and determined by each light sensor module 104-1, 104-2, 104-3, as will be further described herein.

Memory 106 can be volatile or nonvolatile memory. Memory 106 can also be removable (e.g., portable) memory, or non-removable (e.g., internal) memory. For example, memory 106 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical disk storage, and/or a magnetic medium such as magnetic cassettes, tapes, or disks, among other types of memory.

Further, although memory 106 is illustrated as being located in PAPI measurement system 100, embodiments of the present disclosure are not so limited. For example, memory 106 can also be located internal to another computing resource (e.g., enabling computer readable instructions to be downloaded over the Internet or another wired or wireless connection).

As previously described herein, processor 108 can execute executable instructions stored in memory 106 to determine a transition angle of the beam of light from the PAPI unit, the elevation angle of the beam of light with respect to horizontal, and the width of the transition region of the beam of light, based, at least in part, on the intensity of the beam of light determined by each light sensor module 104-1, 104-2, 104-3 (e.g., on the transition region where the beam transitions from red to white identified by each sensor). For example, the transition angle of the beam of light, the elevation angle of the beam of light, and the width of the transition region of the beam of light can be determined by applying trigonometric principles to various positions, distances, etc., in space, calculated based on the intensity profile of the beam of light determined by each light sensor module 104-1, 104-2, 104-3 and the fixed (e.g., known) length(s) by which the light sensor modules are separated (e.g., lengths W and L).

As such, PAPI measurement system 100 can determine the transition angle of the beam of light, the elevation angle of the beam of light, and the width of the transition region of the beam of light without using complex systems such as an image sensing device like a charge-coupled device (CCD) camera and/or complex image processing algorithms. That is, PAPI measurement system 100 may not include such complex systems, as illustrated in FIG. 1, which can have benefits of reduced cost and/or complexity, among other benefits.

The determined transition angle of the beam of light can be, for example, the inclination angle of the beam of light at which the beam of light transitions (e.g., switches and/or changes color) from a first color (e.g., red) to a second color (e.g., white). That is, the determined elevation angle of the beam (e.g., the optical axis of the PAPI unit) with respect to horizontal can correspond to the glide path (e.g., glide angle) being provided by the PAPI unit.

Figure 2:
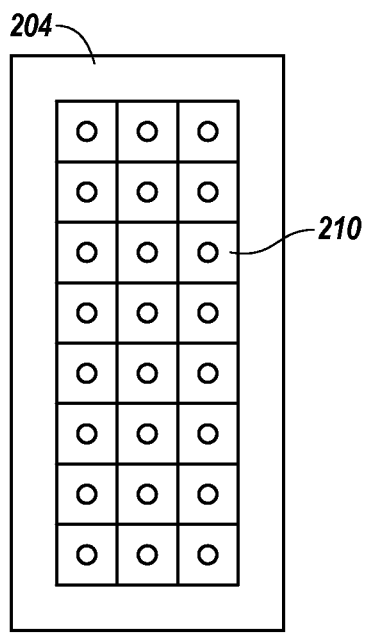
FIG. 2 illustrates a light sensor module in accordance with one or more embodiments of the present disclosure.

FIG. 2 illustrates a light sensor module 204 in accordance with one or more embodiments of the present disclosure. Light sensor module 204 can be, for example, light sensor modules 104-1, 104-2, and/or 104-3 previously described in connection with FIG. 1.

As shown in FIG. 2, light sensor module 204 includes an array (e.g., plurality) of photodetectors 210. Photodetector array 210 can have a size of, for example, 1.25 millimeters (mm) by 2.0 mm by 0.55 mm. However, embodiments of the present disclosure are not limited to a particular size for photodetector array 210, or to a particular number or arrangement of photodetectors in photodetector array 210. For example, the arrangement of the photodetectors in the array can be linear (as shown in FIG. 2), diagonal, matrix-type, or any other functional arrangement.

Each photodetector in photodetector array 210 can determine the intensity of a different portion of a beam of light from a PAPI unit. The intensity of a portion of the beam of light determined by a photodetector in photodetector array 210 can be represented by, for example, an amount of current output by that photodetector. Accordingly, the transition region where the beam transitions from red to white can be identified by comparing the current output by photodetector array 210.

Although not shown in FIG. 2, light sensor module 204 can include a filter (e.g., a color filter) through which the beam of light from the PAPI unit passes before it reaches photodetector array 210. The filter can reduce and/or eliminate the spectrum of red and/or white light that reaches photodetector array 210 in a way that increases sensitivity to the transition line, such as by blocking only red light. Further, although not shown in FIG. 2, light sensor module 204 can include a number of baffles to reduce the viewing angle of photodetector array 210.

Figure 3:
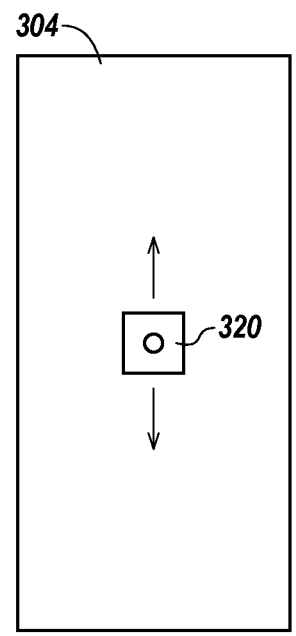
FIG. 3 illustrates a light sensor module in accordance with one or more embodiments of the present disclosure.

FIG. 3 illustrates a light sensor module 304 in accordance with one or more embodiments of the present disclosure. Light sensor module 304 can be, for example, light sensor modules 104-1, 104-2, and/or 104-3 previously described in connection with FIG. 1.

As shown in FIG. 3, light sensor module 304 includes a single (e.g., only one) photodetector 320. Photodetector 320 can be a movable photodetector, as illustrated in FIG. 3. For instance, light sensor module 304 can include a translational stage (not shown in FIG. 3) that can move photodetector 320 vertically (e.g., in the directions illustrated by the arrows in FIG. 3). Moving photodetector 320 can permit photodetector 320 to determine the intensity of different portions of a beam of light from a PAPI unit, and thereby identify the transition region where the beam transitions from red to white.

Figure 4:
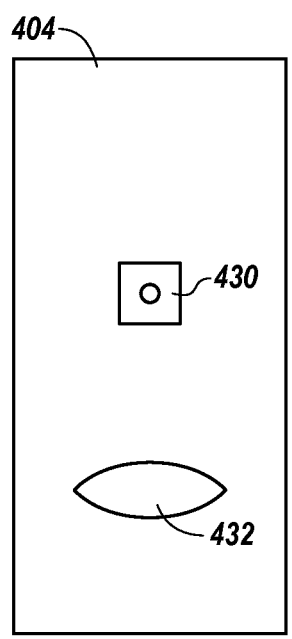
FIG. 4 illustrates a light sensor module in accordance with one or more embodiments of the present disclosure.

FIG. 4 illustrates a light sensor module 404 in accordance with one or more embodiments of the present disclosure. Light sensor module 404 can be, for example, light sensor modules 104-1, 104-2, and/or 104-3 previously described in connection with FIG. 1.

As shown in FIG. 4, light sensor module 404 includes a single (e.g., only one) photodetector 430. Photodetector 430 can be a fixed (e.g., non-movable) photodetector.

As shown in FIG. 4, light sensor module 404 can also include a flexible (e.g., flexi) lens 432 through which a beam of light from a PAPI unit can pass before it reaches photodetector 430. For example, flexible lens 432 can form an image of the beam of light such that photodetector 430 can determine the intensity of different portions of the beam of light, and thereby identify the transition region where the beam transitions from red to white. Flexible lens 432 can be, for example, a lens whose focal length can be varied by applying an external (e.g., electrical) signal thereto.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A precision approach path indicator (PAPI) measurement system, comprising:
a number of light sensor modules, wherein each light sensor module is configured to determine an intensity of a beam of light from a PAPI unit;
a memory; and
a processor configured to execute executable instructions stored in the memory to determine a transition angle of the beam of light from the PAPI unit, an elevation angle of the beam of light with respect to horizontal, and a width of a transition region of the beam of light, based, at least in part, on the intensity of the beam of light determined by each light sensor module.

2. The PAPI measurement system of claim 1, wherein the number of light sensor modules is three.

3. The PAPI measurement system of claim 2, wherein:
the PAPI measurement system includes a T-shaped structure;
a first of the three light sensor modules is located at a first end of the T-shaped structure;
a second of the three light sensor modules is located at a second end of the T-shaped structure; and
a third of the three light sensor modules is located at a third end of the T-shaped structure.

4. The PAPI measurement system of claim 1, wherein at least one of the light sensor modules includes an array of photodetectors.

5. The PAPI measurement system of claim 1, wherein at least one of the light sensor modules includes a single photodetector, wherein the single photodetector is a movable photodetector.

6. The PAPI measurement system of claim 1, wherein at least one of the light sensor modules includes:
a single photodetector, wherein the single photodetector is a fixed photodetector; and
a flexible lens.

7. The PAPI measurement system of claim 1, wherein each of the light sensor modules are separated by a fixed length.

8. The PAPI measurement system of claim 7, wherein the fixed length depends on a resolution of the light sensor modules.

9. A precision approach path indicator (PAPI) measurement method, comprising:
determining an intensity profile of a beam of light from a PAPI unit; and
determining a transition angle of the beam of light from the PAPI unit, an elevation angle of the beam of light with respect to horizontal, and a width of a transition region of the beam of light based, at least in part, on the determined intensity profile of the beam of light.

10. The PAPI measurement method of claim 9, wherein the method includes determining the intensity profile of the beam of light from the PAPI unit using a light sensor module.

11. The PAPI measurement method of claim 9, wherein the elevation angle of the beam of light from the PAPI unit is an inclination angle of the beam of light at which the beam of light transitions from a first color to a second color.

12. The PAPI measurement method of claim 9, wherein the method includes determining the transition angle of the beam of light from the PAPI unit, the elevation angle of the beam of light, and the width of the transition region of the beam of light by applying trigonometric principles to positions and distances in space calculated based on the determined intensity of the beam of light.

13. The PAPI measurement method of claim 9, wherein the method includes determining the transition angle of the beam of light from the PAPI unit, the elevation angle of the beam of light, and the width of the transition angle of the beam of light without using a charge-coupled device camera.

14. A precision approach path indicator (PAPI) measurement system, comprising:
   three light sensor modules, wherein:
      each light sensor module is located at a different vertex of a triangular plane; and
      each light sensor module is configured to determine an intensity of a beam of light from a PAPI unit;
   a memory; and
   a processor configured to execute executable instructions stored in the memory to determine a transition angle of the beam of light from the PAPI unit based, at least in part, on the intensity of the beam of light determined by each light sensor module.

15. The PAPI measurement system of claim 14, wherein:
the system includes a T-shaped structure; and
each light sensor module is located at a different end of the T-shaped structure.

16. The PAPI measurement system of claim 14, wherein each of the light sensor modules includes an array of photodetectors, wherein each photodetector is configured to determine an intensity of a different portion of the beam of light from the PAPI unit.

17. The PAPI measurement system of claim 16, wherein the system includes a filter through which the beam of light from the PAPI unit passes before reaching the photodetectors.

18. The PAPI measurement system of claim 14, wherein each of the light sensor modules includes:
   a single photodetector; and
   a translational stage configured to move the single photodetector such that the single photodetector determines an intensity of different portions of the beam of light from the PAPI unit.

19. The PAPI measurement system of claim 14, wherein each of the light sensor modules includes:
   a single photodetector, wherein the single photodetector is a fixed photodetector; and
   a flexible lens configured to form an image of the beam of light from the PAPI unit such that the single photodetector determines an intensity of different portions of the beam of light.

20. The PAPI measurement system of claim 14, wherein:
a first of the three light sensor modules and a second of the three light sensor modules are separated by a first fixed length;
the first of the three light sensor modules and a third of the three light sensor modules are separated by a second fixed length; and
the second of the three light sensor modules and the third of the three light sensor modules are separated by the second fixed length.

\* \* \* \* \*